United States Patent [19]

Mosse

[11] Patent Number: 5,285,955
[45] Date of Patent: Feb. 15, 1994

[54] CARTONS WITH BELLOWS FOLDED TOPS

[75] Inventor: Richard W. E. Mosse, London, England

[73] Assignee: Tetra Alfa Holdings S.A., Pully, Switzerland

[21] Appl. No.: 917,950

[22] Filed: Jul. 24, 1992

[30] Foreign Application Priority Data

Aug. 1, 1991 [GB] United Kingdom ............... 9116664
Apr. 24, 1992 [GB] United Kingdom ............... 9208961

[51] Int. Cl.$^5$ ................. B65D 5/40; B65D 5/72
[52] U.S. Cl. ................. 229/137; 229/125.42; 229/213; 229/214; 229/249
[58] Field of Search ............ 229/125.42, 137, 213, 229/214, 249

[56] References Cited

U.S. PATENT DOCUMENTS

| | | | |
|---|---|---|---|
| 1,994,923 | 3/1935 | Ross | 229/137 |
| 2,132,925 | 10/1938 | Bensel | 229/137 |
| 3,074,610 | 1/1963 | Pugh | 229/214 |
| 3,189,246 | 6/1965 | Seline, Jr. | 229/249 |
| 3,334,799 | 8/1967 | Crawford | 229/249 |
| 3,349,988 | 10/1967 | Horning . | |
| 3,520,464 | 7/1970 | Pugh, Sr. | 229/249 |
| 4,655,386 | 4/1987 | Billberg | 229/249 |
| 4,762,234 | 8/1988 | Wyberg . | |
| 4,802,620 | 2/1989 | Phillips | 229/137 |
| 4,821,950 | 4/1989 | Sanchez et al. | 229/249 |
| 4,883,222 | 11/1989 | Fujisawa | 229/249 |
| 5,176,308 | 1/1993 | Frazier | 229/125.42 |

FOREIGN PATENT DOCUMENTS

| | | |
|---|---|---|
| 0028941 | 5/1981 | European Pat. Off. . |
| 2515849 | 10/1975 | Fed. Rep. of Germany ........... 229/125.42 |
| 1450445 | 8/1966 | France ........... 229/125.42 |
| WO90/09926 | 9/1990 | PCT Int'l Appl. . |
| 1096254 | 12/1967 | United Kingdom . |
| 2146624 | 4/1985 | United Kingdom . |

*Primary Examiner*—Gary E. Elkins
*Attorney, Agent, or Firm*—Nixon & Vanderhye

[57] ABSTRACT

A carton has an openable bellows folded top comprising opposed side panels (30, 32) and front (34) and rear (28) panels folded in and sealed between the side panels. The panels are sealed together to close the top in a liquid tight manner. The top-forming front panel has an upper sub-panel comprising a central portion (44) having an upper free edge for defining the rim of a pull-out pouring spout and first and second flanking portions (46, 48) of unequal width lying each on a respective side of the central portion. The central portion is of a lesser height than the flanking portions and is not sealed on its interior face to the overlying side panels or to the rear panel in sealing the top. A reliable seal is formed but there is no obstacle to the pulling out of the pouring spout once the wing portions have been peeled apart.

11 Claims, 7 Drawing Sheets

CARTONS WITH BELLOWS FOLDED TOPS

FIELD OF THE INVENTION

The present invention relates to cartons having an openable bellows folded top.

BACKGROUND TO THE INVENTION

Cartons having bellows folded tops are in widespread use for the packaging of liquids, especially milk, fruit juices and soft drinks. A persistent problem with cartons of this type is the difficulty which is experienced in opening the cartons to provide a pouring spout. Cartons of this type have a top formed from top-forming front, rear and opposed side panels in which the front and rear panels are folded in between the side panels along fold lines running on each of the front and rear panels from the bottom corners of the respective panel to meet on the center line of the panel a little way below the top of the panel. Each of the front and rear panels is thereby divided by fold lines into a central isosceles triangular region being flanked on each side by a triangular wing region. These regions are surmounted by a generally rectangular transversely running narrow sub-panel which is incorporated into a sealing fin on the top of the closed carton.

To open such a carton one is directed to peel apart the wing regions of the front panel of the top and then by inward pressure to pop forward the front panel to form a pouring spout. This operation is only straightforward if the marginal top edge portion of the front panel is not strongly sealed internally to the adjacent side portions of the top. Ideally, the front panel of the top would be sealed to the side panel internally only in small corner regions near the common border of the top panel and the adjacent side panel. However, in practice, such an arrangement is not possible if a reliable liquid tight seal is to be formed. It is generally found necessary to adopt some action to prevent a pin-hole leak occurring caused by the difficulty of making a reliable seal at the point where the apex of the folded in rear panel lies. At this point, there is a step in the fin caused by a transition from four thicknesses of paperboard to two thicknesses. Typically, the problem of making a reliable seal at this point is solved by sealing the apex of the front panel to the apex of the rear panel so that the liquid is retained below the step. If this is not done, liquid may pass up above the top edge of the folded-in front and rear panel and may then track forward beneath the internal top seal of the fin and escape at the front of the package at the point in the sealing fin where there is again a step between four thicknesses of paperboard and two thicknesses of paperboard at the corners where the front panel and the side panels join. No satisfactory solution to this problem has been found which does not involve some degree of sealing of the front panel top edge internally with consequent resistance to opening of the pouring spout of the package.

Attempts have been made to overcome this problem by the use of coatings to reduce the strength or minimize the area of the seal, but these coatings are costly and their function dependent on accurate temperature control when heat sealing which is not always achieved in practice.

SUMMARY OF THE INVENTION

The present invention relates to a carton having an openable bellows folded top comprising opposed side panels and front and rear panels folded in and sealed between said side panels, said panels being sealed together to close the top in a liquid tight manner, said top-forming front panel comprising an upper sub-panel comprising a central portion having an upper free edge for defining the rim of a pull-out pouring spout and first and second flanking portions of unequal width lying each on a respective side of said central portion, wherein said central portion is of a lesser height than said flanking portions and said central portion is not sealed on its interior face to the overlying side panels or to the rear panel in sealing the top.

Because the sub panel of the front panel includes flanking regions of increased height with respect to the central region, there is no step between two thicknesses and four thicknesses of paperboard as one moves vertically up the corner in the fin region at the junction of the front panel and the side panels. Equally, because the two flanking regions are of unequal width, there is no step from four thicknesses of paperboard to two thicknesses as one moves along the fin away from the front of the carton. Rather, there are two steps, each of a single thickness of paperboard in height. We have found that it is possible to seal such single thickness steps reliably, thus there is no need for the front panel to be sealed at its apex to the apex of the rear panel. Any liquid which succeeds in passing above the junction of the apex of the rear panel and the apex of the front panel will be reliably trapped below the sealing of the fin.

There is thus no obstacle to the pulling or popping out of the pouring spout once the wing portions have been peeled apart.

Preferably, the width of one said flanking portion is at least 2 mm greater than the width of the other said flanking portion, e.g. about 4 mm greater.

Preferably, the height difference between said central portion and said flanking portions is at least 5 mm, e.g. about 9 mm. The flanking portions are preferably of equal height to one another and preferably are of equal height to corresponding fin forming sub-panels of the side panels of the carton.

Preferably, a respective line of weakening or cut line is provided at least approximately extending the line of the said free edge of the center portion and running across at least part of the width of each said flanking portion. This facilitates the full width opening up of the spout despite there being an interior face—interior face heat seal between each flanking portion and the adjacent side panel.

Preferably, each said line of weakening or cut line runs from a point adjacent but spaced from a respective end of said free edge of the center portion.

Optionally, a tab may be provided fixed to the surface of the top-forming front panel to be gripped and pulled by the user during opening of a carton formed from the blank. Such a tab may be of plastics material and may be heat sealed to the front panel. However, the use of adhesive is also possible, for instance hot-melt adhesive. As those skilled in the art will be aware, cartons of this type are always in practice formed from materials which are heat sealable on the external and internal surfaces, e.g. paperboard or cardboard coated with a heat sealable plastics materials such polyethylene. However, the principles described herein can be applied to cartons formed from other materials and sealed by the use of adhesives, e.g. hot melt adhesives.

Preferably, such a pull tab comprises a heat sealable first layer and a more heat resistant second layer. The second layer is preferably selected to provide the required toughness and tensile strength in the tab.

Preferably the heat sealable layer is polyethylene. However, other heat sealable materials may be employed such as ethylene/vinyl acetate blends and microcrystalline wax. The outer layer may be regenerated cellulose, nylon or polyester or may be selected from any other suitable material. The outer layer may contain or consist of a reinforcement such as fibre reinforcement or scrim in order to increase its tensile strength.

A portion of the tab remains unsealed to be available to be gripped by the user.

The invention includes a blank for forming a carton as described above. In particular, the invention includes a carton adapted to be erected and sealed to form a carton having a bellows folded top, which blank comprises body forming panels and bottom forming panels and panels for forming a top including opposed side panels and front and rear panels, wherein said front panel comprises an upper sub-panel comprising a central region of lesser height and first and second flanking portions of greater height lying each on a respective side of said central portion and being unequal to one another in width. Such a blank may of course have a pull tab of the kind described above secured to the top-forming front panel.

The invention further includes a method of making a carton from a blank of the kind described above which comprises forming the blank into a tube, sealing edges of the blank, closing the bottom of the tube, folding in said top-forming front and rear panels between said top forming side panels, and forming a liquid tight interior seal of the upper marginal portions of the top-forming panels without forming an interior seal of the upper sub-panel of the front panel to the overlying side panels or to the rear panel.

Preferably, the top-forming panels are sealed to one another by heat sealing, and are raised to heat sealing temperatures by use of a heater having a plurality of gas outlet jets for supply of heated gas to warm the interior and exterior of said top forming panels by directing said heated gas on to selected portions of said top-forming panels.

More particularly, the cartons may be closed using a carton packing machine comprising means for joining portions of a carton to one another by heat-sealing, which means comprises a heater nozzle having at least one gas outlet jet for the supply of heated gas to warm a said carton portion to a sealing temperature by directing said heated gas on to said portion, which nozzle is provided with a shield member extending from the nozzle in the general direction of the gas flow from the said jet, the shield member being positioned so as to deflect heated air from contacting the interior of said carton in said central region of the upper sub-panel of the front panel.

Preferably, said heater nozzle is positioned alongside the mouth of a carton to be closed, and has a plurality of said gas jets arranged to be directed against the walls of the carton adjacent the carton mouth.

Preferably, said nozzle has a proximal gas inlet and a closed distal end and comprises nozzle walls enclosing a gas passageway and further comprises a multitude of said gas outlet jets extending from said gas passageway to the external surface of said walls. Said nozzle walls may include a pair of substantially planar walls which meet at an obtuse angle and comprise a band of said gas outlet jets extending from said gas passageway to the external surface of the said walls. Said shield member preferably lies immediately adjacent said band and extends alongside a portion thereof. The shield member may lie between the said portion of the band and the inlet end of said nozzle.

Said band may preferably have a first portion of lesser width and second and third portions of greater width, said second and third portions lying at respective ends of said first portion and said shield member extending alongside said first portion between said second and third portions of said band.

The heat sealing machine may comprise a nozzle assembly which includes said heater nozzle as a first heater nozzle and further includes a second heater nozzle and a third heater nozzle. The first and third heater nozzles may be disposed one on either side of said second heater nozzle such that a carton mouth may be positioned over said second heater nozzle and between said first and third heater nozzles so as to be heated on interior surfaces by said second heater nozzle and on oppositely directed exterior surfaces by said first and third heater nozzles.

In transverse cross-section, said second nozzle may have the form of a waisted quadrilateral and said first and third nozzles may be positioned opposite the faces of the second nozzle which contains said waist.

The said nozzle may have a multitude of gas outlet jets arranged in a band extending around approximately three quarters of the perimeter of said nozzle including that part thereof which is opposite to said third nozzle and those parts extending between said third nozzle and said first nozzle.

Said band of gas outlet jets on said second nozzle may be relatively wide opposite said third nozzle and on each of those parts extending between said third nozzle and said first nozzle may have a relatively wide portion nearest to said third nozzle and a relatively narrow portion extending therefrom towards said first nozzle.

Said relatively wide portions of said band in the part thereof extending between said third nozzle and said first nozzle are preferably of approximately equal length to the relatively narrow portions.

The gas outlets jets in said relatively narrow portions of said band may preferably be angled to extend in use toward the mouth of a container being closed in said machine.

The relatively narrow position of the band of gas outlet jets adjacent to the shield member may be from 30 to 60 percent the width of the relatively wide portion of said band of jets. Those gas jets which are angled to extend toward the mouth of the carton during use may be arranged at an angle to the nozzle wall as it extends towards the distal end of the nozzle, measured in a plane perpendicular to the wall of the nozzle at the jet, of from 100 to 160°, more preferably, 120 to 150°, e.g. 135°.

The use of angled gas outlet jets in heater nozzles for sealing the mouths of cartons is more fully described in British Patent Application No. 9106306.5 filed 25 Mar. 1991.

To assist in reliably sealing the single board thickness steps in the fin caused by the flanking portions of the first sub-panel, it is preferred to provide projections such as stakes or ribs on one or both sealer jaws used for sealing the fin. Thus, such ribs can be used to apply a greater pressure to the fin at the location of the steps during the sealing operation so as to improve the seal locally.

Therefore, the invention includes apparatus for sealing the openable top of a carton as described comprising a pair of opposed sealer jaws for pressing the top of said side panels with said front and rear top panels folded between said side panels in a sealing operation, wherein at least one of said jaws has thereon a first protrusion for applying extra pressure to said side panels at the point where the side edge of the wider of said flanking portions lies under the side panels, and at least one of said jaws has thereon a second protrusion extending away from its respective jaw to a lesser extent than does said first protrusion from its respective jaw and being for applying extra pressure to said side panels at the point where the side edge of the narrower of said flanking portions lies under the side panels.

The difference in the extent of protrusion of the first and second protrusions is typically within the range 0.4 to 1.00 mm, according to the thickness of the carton board, e.g. about 0.6 mm.

At least one of said jaws preferably has thereon a further protrusion for applying extra pressure to the bight of the fold at the junction between each said side panels and the flanking portions of the respective upper sub-panel.

Said protrusions are preferably provided on one or more insert pieces received in respective apertures in said jaws. This facilitates radiusing of the protrusions to minimize the likelihood of them penetrating into the carton board.

The or each said jaw preferably has a recess therein for reducing the pressure applied during sealing along a line corresponding to the location of the said upper free edge of the said central portion of the upper sub-panel.

Preferably only one jaw is provided with the projections, the other being plain.

The invention includes a pair of sealing jaws for apparatus for sealing the openable top of a carton as described.

BRIEF DESCRIPTION OF THE DRAWINGS

The invention will be further described and illustrated with the reference to the preferred embodiments shown in the accompanying drawings in which:

FIG. 4b is a front elevation of the nozzle of FIG. 4a;

FIG. 5b is a front elevation of the heater nozzle of FIG. 5a;

FIG. 6b is an elevation of the side marked "B" of the heater nozzle of FIG. 6a;

FIG. 6c is a side elevation showing the side marked "C" of the heater nozzle of FIG. 6a;

FIG. 6d is a side elevation of the side marked "D" of the heater nozzle of FIG. 6a;

FIG. 6e is a side elevation of the side marked "E" of the heater nozzle of FIG. 6a;

DETAILED DESCRIPTION OF PREFERRED EMBODIMENTS

Figure 1:
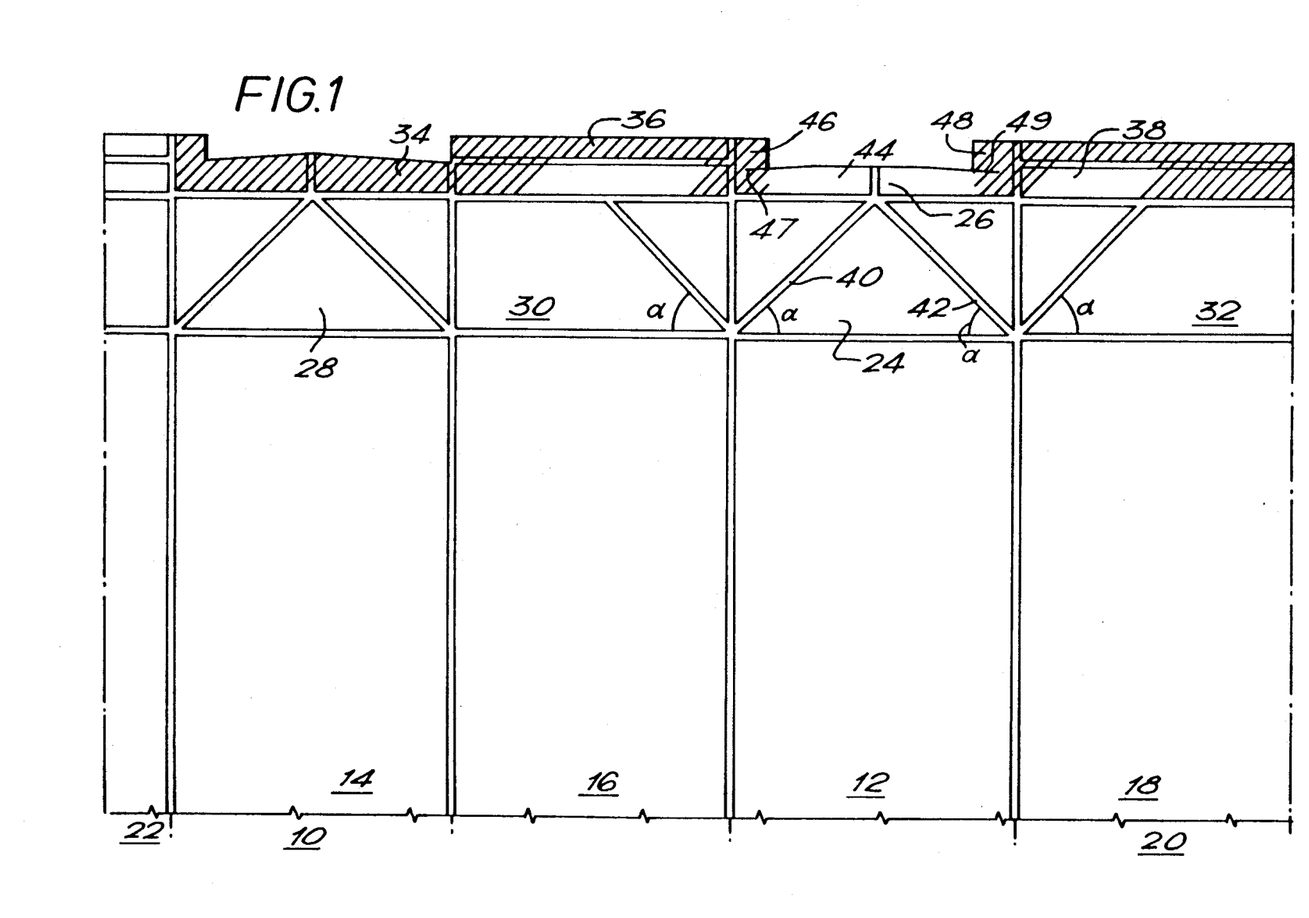
FIG. 1 shows the interior face of a blank for producing a carton having a flat bellows folded top.
Figure 2:
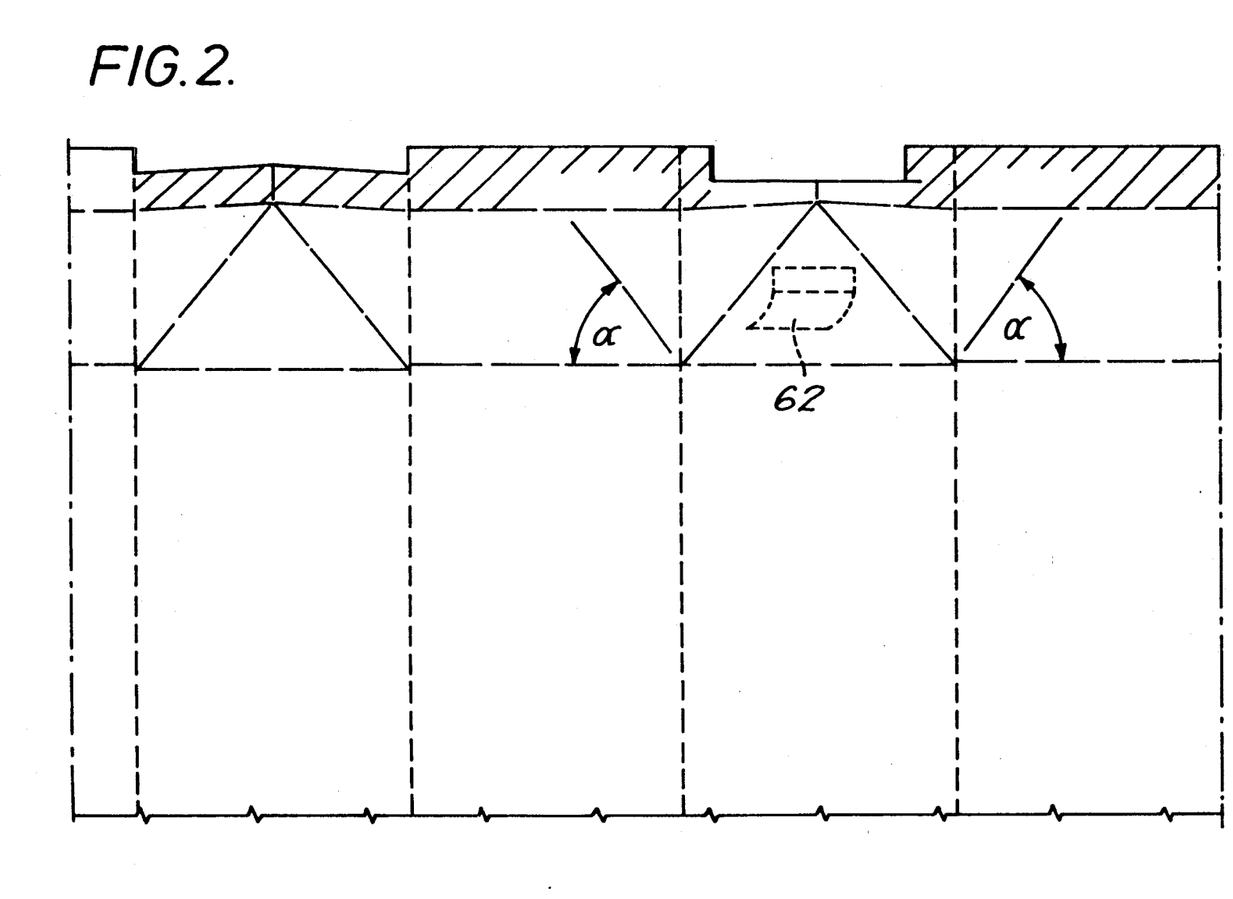
FIG. 2 shows the interior face of a blank for folding and sealing to form a carton having a bellows folded top of the gable type.

As shown in FIGS. 1 and 2, carton blanks in accordance with the invention may be of conventional form save in respect of the front top forming panel as described in more detail below. Thus, the blank 10 shown in FIG. 1 comprises front, rear and opposed side body-forming panels 12, 14, 16, 18, conventional bottom-forming panels 20 and a conventional fifth panel 22 bordering upon the rear panel 14. The illustrated blank is cut from a continuous web.

The blank further comprises a top forming front panel 24 having an upper sub-panel 26. It further comprises top-forming rear and side panels 28, 30, 32 each having a respective fin-forming upper sub-panel 34, 36, 38. The panels are demarcated by preformed crease lines. Additional preformed crease lines are provided for the folding of the top and the bottom of the carton. These include preformed crease lines 40, 42 extending from the bottom corners of the top-forming front panel 24 to the center of its upper edge where it borders the sub-panel 26. It will be noted that the upper edge of the top-forming front panel 24 is not flat but is in the form of a shallow peak.

Further angled crease lines extend from the lower corner of each top-forming side panel adjacent its junction with the front panel toward the center of the upper edge of the respective side panel. Each of the angled crease lines makes an angle $\alpha$ with the junction between the top-forming panels and the body-forming panels. In FIG. 1 the angle $\alpha$ is 47° and in FIG. 2 the angle o is 53°.

The sub-panel 26 of the top-forming front panel 24 comprises a central region 44 and flanking regions 46, 48. The height of the central region is substantially less than the height of the flanking regions. For instance, the central region may have a height of 7 mm whilst the flanking regions have a height of 16 mm. The width of the central region may be approximately 5/7ths of the total width of sub-panel. The widths of the two flanking regions are unequal and may for instance differ by about 4 mm.

When the blank is folded in a conventional manner, a seal may be formed on the interior of the blank in the areas shaded in the drawings. It will be noted that the shaded area does not include any part of the central region 44 of the sub-panel 26. Because of the unequal widths of the flanking regions 46 and 48, no single step from two paperboard thicknesses to four paperboard thicknesses is formed in the front part of the resulting fin and the top of the fin can reliably be sealed. The external faces of the flanking regions 46 and 48 as well as their internal faces are sealed together and the external faces of the two halves of the central region 44 are sealed to one another. This external seal is easily broken by pulling apart the wing portions formed by the triangular areas of the top-forming panel 24 lying below the sub-panel 26. The top-forming front panel can then easily be popped forward as a spout having a rim provided by the top edge of the central region 44 of the sub-panel 26.

To further facilitate the opening of the spout across the width of the top-forming front panel, the blank shown in FIG. 1 is provided with two slits 47, 49 which continue the line of the upper edge of the central region 44. Preferably, as shown in the drawings, the slits 47, 49 do not extend all the way to the junction between the central region and the respective flanking region so that a narrow bridge of uncut board is provided between the upper edge of the central region 44 and the commencement of the respective slit 47, 49 most of the way towards the crease line demarcating the border between the respective flanking region 46, 48 and its adjacent top-forming side panel 36, 38. In use, as the spout is pulled forward the said bridges tear allowing the full width of the spout to open leaving the upper parts of the flanking regions 46, 48 bonded to the internal surface of the adjacent top-side panels.

To achieve the selective heating necessary to form the interior seal by heat-sealing without involving the central region 44, one may employ a heater nozzle assembly as shown in FIGS. 3 to 7.

Figure 3:
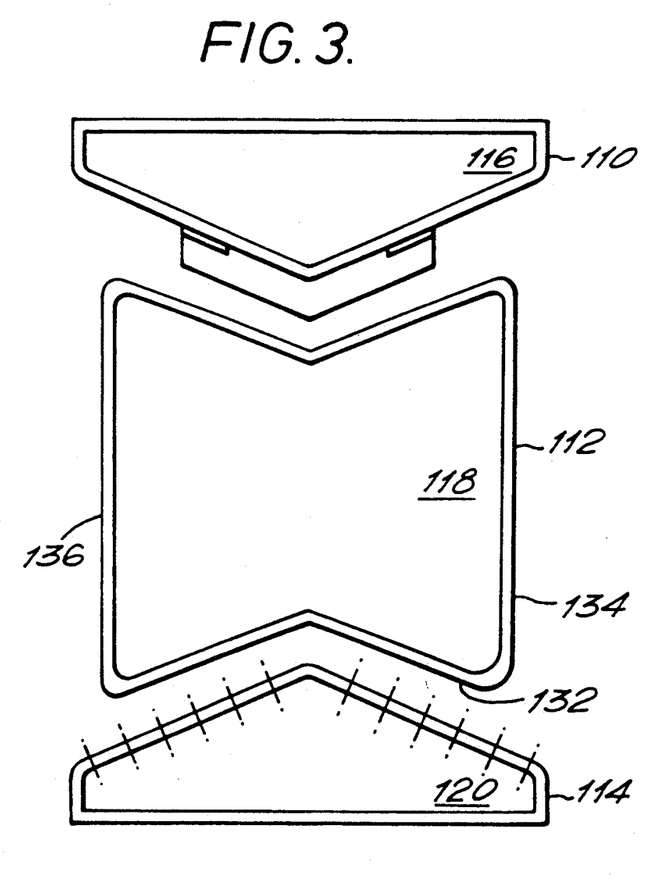
FIG. 3 shows in plan view a heater nozzle assembly for use in closing a carton formed from a blank as shown in FIG. 1.
Figure 4A:
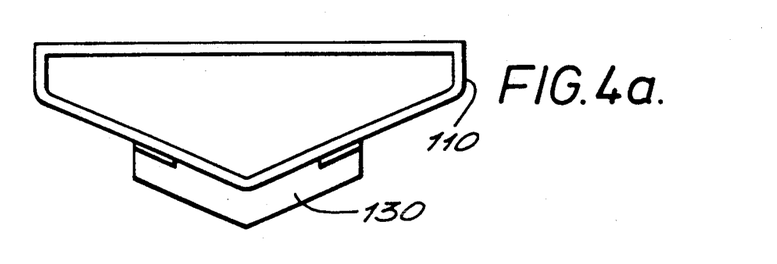
FIG. 4a is a plan view of a first heater nozzle from the assembly of FIG. 3, incorporating a shield member.
Figure 4B:
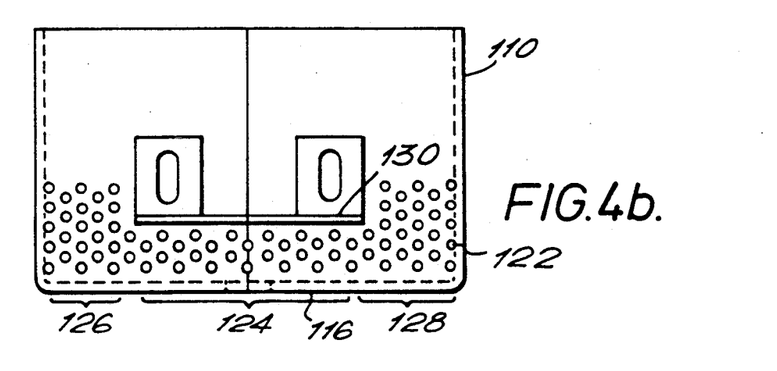

The heater nozzle assembly comprises a first heater nozzle 110, a second heater nozzle 112 and a third heater nozzle 114. Each of these heater nozzles has an open proximal end and closed distal end 116, 118 and 120 respectively. The heater nozzles are arranged with the first and third heater nozzles lying adjacent opposite respective sides of the second heater nozzle 112 with a gap therebetween so that the mouth of a carton may be fitted over the second heater nozzle 112 and walls of the carton will come to lie between the second heater nozzle 112 and the first and third heater nozzles 110 and 114.

Figure 5A:
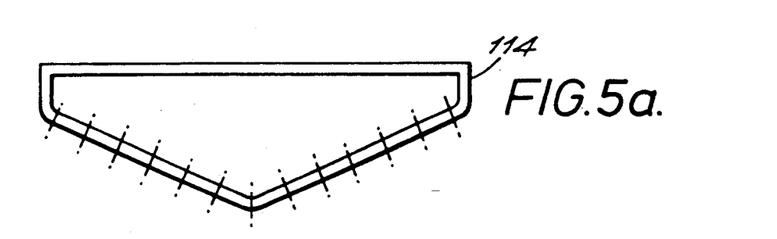
FIG. 5a is a plan view of a second heater nozzle for heating the exterior of a carton during sealing which is incorporated in the nozzle assembly of FIG. 1.
Figure 5B:
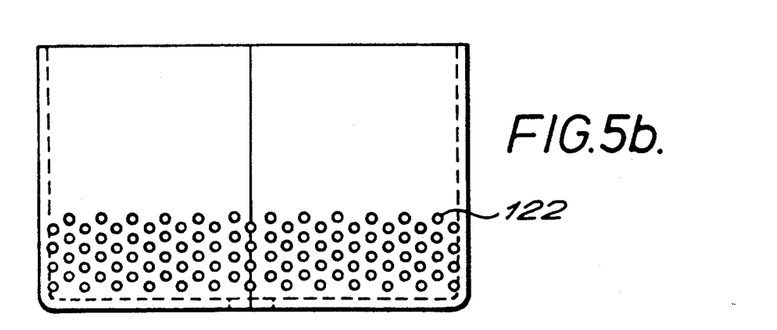
Figure 6A:
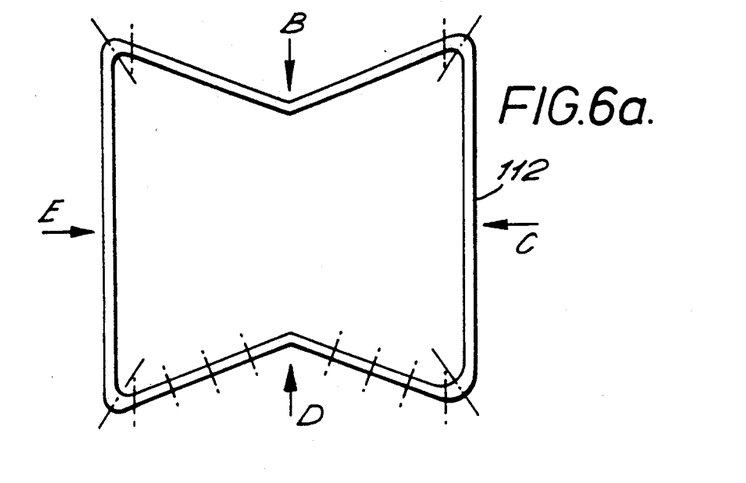
FIG. 6a is a plan view of the heater nozzle for heating the interior of a carton during sealing incorporated in the nozzle assembly of FIG. 3.
Figure 6B:
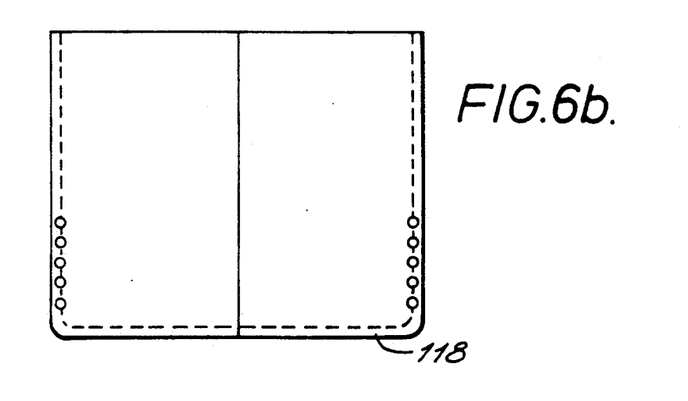
Figure 6C:
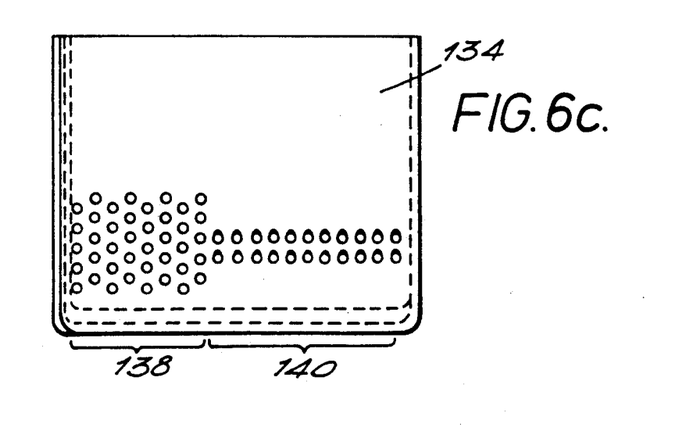
Figure 6D:
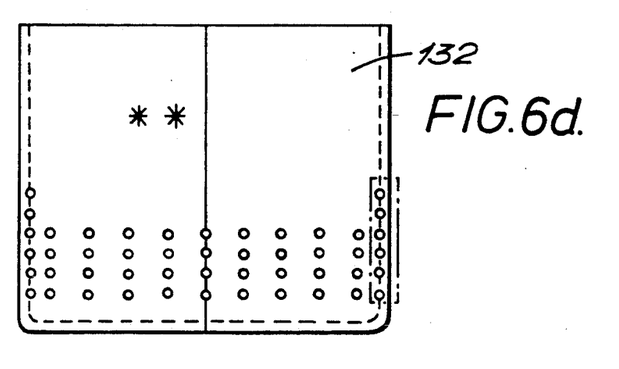
Figure 6E:
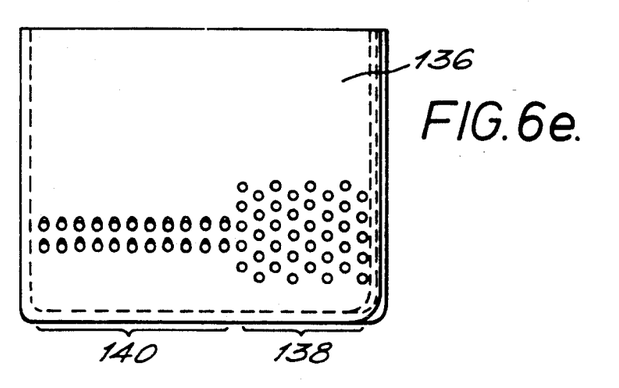

The first heater nozzle 110 of the assembly of FIG. 3 is in use directed against top-forming front panel 123 of the carton. As shown in FIGS. 5a and 5b, the first heater nozzle 110 has a multitude of gas outlet jets 112 extending from its exterior periphery to its interior hollow space and arranged in a band running across two front faces thereof which meet at an angle of 134° defining a shallow nose. The gas outlet jets run perpendicular to their respective faces. The band of outlet jets 112 can be divided into three portions, namely a first central portion 124 and first and second outer portions 126, 128. Outer portions 126 and 128 are relatively wide and the central portion 124 is relatively narrow. Immediately above the central portion 124 is positioned a shield member 130 in the form of a chevron shaped plate projecting from the nose of the nozzle above the central portion 124 of the band of gas outlet jets.

The third nozzle 114 of the assembly of FIG. 3 is generally similar in shape to the nozzle 110 but lacks the shield 130 and the band of the gas outlet jets 112 thereon is of constant width. The width of the band of nozzles is similar to that of the wider parts 126, 128 of the band on the nozzle 110. The second heater nozzle 112 of the assembly of the FIG. 3 in plan takes the form of a waited quadrilateral and has two opposite flat side faces and two opposite dished side faces. A band of gas outlet jets runs around the nozzle 112 adjacent its closed end 118. On the dished face 132 which faces the third heater nozzle 114 the band is relatively wide. The jets are directed at right angles to the face 132 with the exception of those jets lying on the corners between the face 132 and the adjacent side faces which are directed at about 45° outward to the side from the face 132.

On each of the two flat faces 134, 136, the band of jets has a first portion 138 of greater width and a second portion 140 of lesser width, the length of the portion 140 being slightly greater than that of the portion 138 and the width of the portion 140 being approximately one third of that of the portion 138. On the remaining face of the nozzle 112, no gas outlet jets are provided except at the corner junctions between the face and the faces 132, 136 where a relatively tall column of gas outlet jets is provided which are directed to about 45° to the adjacent side faces 134, 136.

Those gas outlet jets in the relatively narrow portions 140 of the band on the side faces 134 and 136 are angled upwardly at about 45° away from the base 118 of the nozzle 12. This prevents the zone of heating on the forward parts of the side panels encroaching too far into the carton.

Figure 7:
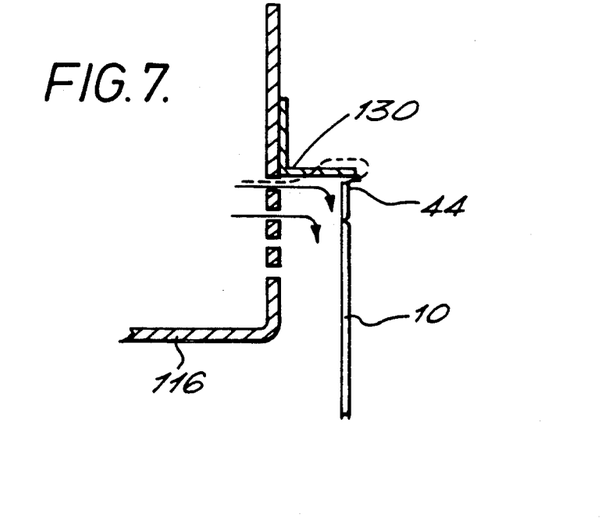
FIG. 7 shows in schematic cross-section a portion of the heater nozzle of FIG. 4a in use to heat the upper portion of a carton during the closing thereof.

As shown in FIG. 7, the effect of the shield 120 is to block hot air passing through the gas outlet jets in the region 124 of the band of jets in nozzle 110 from following the dotted path in FIG. 7 to reach the top edge of the interior surface of the carton in the region of the central region 44 of the top-forming front panel 24 where it is important that no heat seal is inadvertently obtained. Instead, gas flow is diverted downwardly over the exterior of the wall of the carton blank 10. This improves the reliability with which an easy opening carton of the kind formed from a blank shown in FIG. 1 can be sealed satisfactorily with the spout forming portion free to pull forward as the carton is opened by tearing the external seal between the surrounding portions of the carton wall.

In use, the fifth panel 22 of the blank is sealed to the side panel 20 to form a tubular blank, a bottom seal is made in a conventional manner and the resulting open carton is filled. A top seal is then made by placing the carton mouth in a heater nozzle assembly as shown in FIG. 3. Hot air is passed into the nozzle assembly to heat selectively the required regions of the top of the blank. Sealer jaws equipped with ribs are used to compress the heated carton material together at appropriate locations, the ribs applying increased pressure over the edge of each of the flanking portions 46, 48.

As shown in FIG. 2, a pull-tab 62 may be provided on the top-forming front panel to assist in opening the carton.

Figure 8:
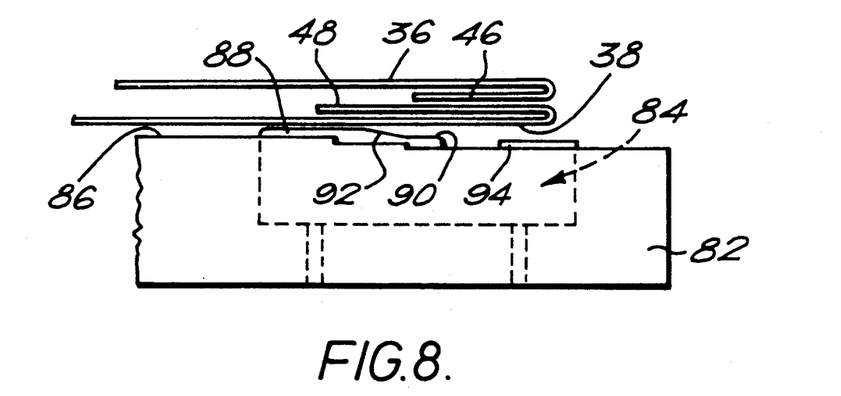
FIG. 8 shows in plan view one of a pair of sealer jaws for sealing the top of a carton formed from a blank as shown in FIG. 1 or FIG. 2.

FIG. 8 illustrates one of a pair of sealer jaws used in apparatus for sealing the openable top of a carton formed from a blank as shown in FIG. 1 or FIG. 2. Its companion jaw will be conventional and will have a plane surface. In other respects also, the sealing apparatus may be conventional although preferably it includes a heater nozzle assembly as illustrated in FIG. 3. As shown one of the two sealer jaws of the apparatus is provided with a narrow slot extending along the line of the sealing fin of the carton, within which slot is received an insert 84 provided with a series of projections which, when the insert is in place in the slot, project from the face 86 of the jaw 82. A first projection 88 extends from the face of the jaw 82 in the region where the edge of the flanking portion 48 lies between the top-forming side portions 36, 38 in the folded fin. A second projection 90 of lesser height is provided which is connected via a ramp portion 92 to the first projection 88. The projection 90 coincides with the point at which the free edge of the flanking portion 46 lies between the top-forming side portions 36 and 38. The height of the projections 88 and 90 is chosen so as to apply sufficient extra pressure to make a reliable seal, overcoming the tendency for a leakage channel to form where the portions of board 36 and 38 have to spread apart to embrace the flanking portions 46 and 48 but without applying so much pressure as to penetrate the board. Typically, the projection 88 protrudes from the face of the jaw 86 by about 0.6 mm more than the projection 90 to take account of the fact that there is one less thickness of board between the jaws at that point than at the site of the projection 90.

A further projection 94 is provided at the location of the nose of the fin to assist in crushing the bight of the folded junction between each of the top-side panels and its respective adjacent flanking portion of the front panel. This assists in preventing leakage channels forming within the bight of the fold in each case.

Similar projections 96, 98 are provided for helping to make a good seal where the free side edge of the fifth panel 22 is sealed between the adjacent top-forming side panels 36, 38.

The edges of the projections are preferably radiused to avoid sharp corners although this is not shown in the drawings. By providing the projections on a removable insert 84, this rounding operation is made much more straightforward than would be the case if the projections were formed on the face of the jaw itself in one piece.

Figure 9:
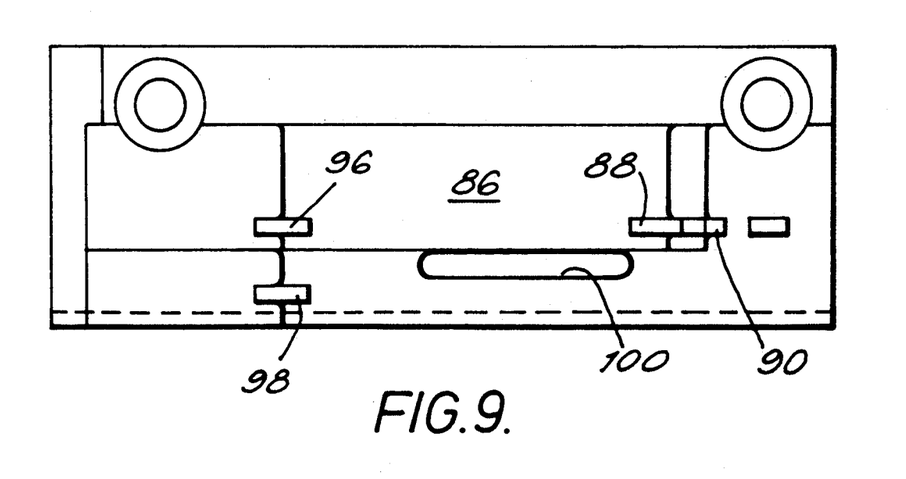
FIG. 9 is a front elevation of the jaw of FIG. 8.

A recessed slot 100 may be provided as shown in FIG. 9 coinciding with the line of the upper free edge of the central portion of the top-forming front panel to discourage the formation of an internal seal between the said central portion and the adjacent side panels 36 and 38.

Many modifications and variations of the invention as described with reference to the drawings are possible within the scope of the invention.

I claim:

1. A carton having an openable bellows folded top comprising opposed side panels and front and rear panels folded in and sealed between said side panels, said panels being sealed together to close the top in a liquid tight manner, each said panel having an exterior face and an interior face, said top-forming front panel comprising an upper sub-panel comprising a central portion having an upper free edge defining a rim for a pull-out poring spout and first and second flanking portions of unequal width lying each on a respective side of said central portion, wherein said central portion is of a lesser height than said flanking portions and said central portion is not sealed on its interior face to the overlying side panels or the rear panel in sealing the top.

2. A carton as claimed in claim 1 wherein the width of one said flanking portion is at least 2 mm greater than the width of the other said flanking portion.

3. A carton as claimed in claim 2 wherein the width of said one flanking portion is about 4 mm greater than the width of said other flanking portion.

4. A carton as claimed in claim 1 wherein the height difference between said central portion and said flanking portions is at least about 5 mm.

5. A carton as claimed in claim 4 wherein said height difference is about 9 mm.

6. A carton as claimed in claim 1 having a pull-tab on said top-forming front panel to assist in pulling forward said spout.

7. A carton as claimed in claim 1 wherein a respective line of weakening is provided at least approximately extending in line with the said free-edge of the central portion and running across at least part of the width of each said flanking portion.

8. A carton as claimed in claim 7 wherein each said line of weakening runs from a point adjacent but spaced from a respective end of said free edge of the central portion.

9. A carton as claimed in claim 1 wherein a respective cut line provided at least approximately extending in line with the said free-edge of the central portion and running across at least part of the width of each said flanking portion.

10. A carton as claimed in claim 7 wherein each cut line runs from a point adjacent but spaced from a respective end of said free edge of the central portion.

11. A carton blank adapted to be erected and sealed to form a carton having a bellows folded top, which blank comprises body forming panels and bottom forming panels and panels for forming the top including opposed side panels and front and rear panels, wherein the said front panel comprises an upper sub-panel comprising a central region of lesser height and first and second flanking portions of greater height lying each on a respective side of said central portion and being unequal to one another in width.

* * * * *